US007257547B1

(12) United States Patent
Terase

(10) Patent No.: US 7,257,547 B1
(45) Date of Patent: Aug. 14, 2007

(54) SERVICE MANAGING SYSTEM

(75) Inventor: Takao Terase, Kanagawa (JP)

(73) Assignee: World Picom Corporation, Yokohama-shi (JP)

( * ) Notice: Subject to any disclaimer, the term of this patent is extended or adjusted under 35 U.S.C. 154(b) by 686 days.

(21) Appl. No.: 09/638,063

(22) Filed: Aug. 15, 2000

(30) Foreign Application Priority Data

Aug. 20, 1999 (JP) ................................. 11-233655
Apr. 20, 2000 (JP) ............................ 2000-119233

(51) Int. Cl.
*G06Q 30/00* (2006.01)
*G06Q 50/00* (2006.01)
*G20Q 20/00* (2006.01)

(52) U.S. Cl. ........................... 705/15; 705/16; 705/17; 705/18; 705/19; 705/20

(58) Field of Classification Search .................. 705/15, 705/16, 17, 18, 19, 20, 21
See application file for complete search history.

(56) References Cited

U.S. PATENT DOCUMENTS

| 3,267,436 | A | * | 8/1966 | Alpert et al. ................. 705/15 |
| 3,304,416 | A | * | 2/1967 | Wolf ............................ 377/13 |
| 3,310,797 | A | * | 3/1967 | Auger ................... 340/286.09 |
| 3,821,707 | A | * | 6/1974 | Peters ......................... 340/7.2 |
| 4,074,793 | A | * | 2/1978 | Yuter ........................... 186/38 |
| 4,128,757 | A | * | 12/1978 | Garner, Jr. ................... 235/383 |
| 4,222,111 | A | * | 9/1980 | Sloan et al. ........... 340/286.09 |
| 4,388,689 | A | * | 6/1983 | Hayman et al. ............... 705/15 |
| 4,415,065 | A | * | 11/1983 | Sandstedt ..................... 705/34 |
| 4,516,016 | A | * | 5/1985 | Kodron ................. 235/462.49 |
| 4,518,821 | A | * | 5/1985 | Yuter .......................... 379/172 |
| 4,530,067 | A | * | 7/1985 | Dorr ............................ 705/15 |
| 4,547,851 | A | * | 10/1985 | Kurland ....................... 705/15 |
| 4,553,222 | A | * | 11/1985 | Kurland et al. ............... 705/15 |
| 4,582,172 | A | * | 4/1986 | Takeuchi et al. .............. 186/38 |

(Continued)

FOREIGN PATENT DOCUMENTS

JP          58-137076         8/1983

(Continued)

OTHER PUBLICATIONS

White, Ron, How Computers Work Millennium Ed. Que Corporation, Sep. 1999.*

(Continued)

*Primary Examiner*—Andrew J. Fischer
*Assistant Examiner*—Peter L. Ludwig
(74) *Attorney, Agent, or Firm*—Oblon, Spivak, McClelland, Maier & Neustadt, P.C.

(57) ABSTRACT

A service managing system comprises: order terminals for enabling customers to view contents of service items and to order desired items, and being portable and driven by a battery; order-receiving terminals for receiving and indicating orders from the order terminals; an accounting unit for casting accounts in response to a customer's request and indicating a calculated result; and a control unit for processing data between the order terminals, order-receiving terminals and an accounting unit. In the system, data are transmitted and received using radio communications between the order terminals, order-receiving terminals, accounting unit and control unit. When an ordered item or service is ready, it is indicated on the order terminal via the order receiving terminal.

30 Claims, 7 Drawing Sheets

U.S. PATENT DOCUMENTS

| | | | | |
|---|---|---|---|---|
| 4,701,849 A | * | 10/1987 | Elden | 705/11 |
| 4,722,053 A | * | 1/1988 | Dubno et al. | 463/42 |
| 4,800,438 A | * | 1/1989 | Yuter | 348/836 |
| 4,935,720 A | * | 6/1990 | Kalfoun | 340/286.09 |
| 5,003,472 A | * | 3/1991 | Perrill et al. | 705/15 |
| 5,018,066 A | * | 5/1991 | Yagi | 705/21 |
| 5,128,862 A | * | 7/1992 | Mueller | 705/15 |
| 5,272,474 A | * | 12/1993 | Hilliard | 340/825.29 |
| 5,347,734 A | * | 9/1994 | Howell et al. | 40/506 |
| 5,355,115 A | * | 10/1994 | Goor et al. | 340/321 |
| 5,463,742 A | * | 10/1995 | Kobayashi | 710/303 |
| 5,488,572 A | * | 1/1996 | Belmont | 710/62 |
| 5,489,887 A | * | 2/1996 | Porras | 340/332 |
| 5,587,560 A | * | 12/1996 | Crooks et al. | 178/18.03 |
| 5,594,409 A | * | 1/1997 | Shank | 340/326 |
| 5,596,728 A | * | 1/1997 | Belmont | 710/304 |
| 5,625,829 A | * | 4/1997 | Gephardt et al. | 710/104 |
| 5,627,974 A | * | 5/1997 | Watts et al. | 710/304 |
| 5,699,226 A | * | 12/1997 | Cavello | 361/686 |
| 5,748,083 A | * | 5/1998 | Rietkerk | 340/568.2 |
| 5,757,616 A | * | 5/1998 | May et al. | 361/683 |
| 5,798,951 A | * | 8/1998 | Cho et al. | 710/303 |
| 5,800,264 A | * | 9/1998 | Pascal et al. | 463/16 |
| 5,826,043 A | * | 10/1998 | Smith et al. | 710/303 |
| 5,828,294 A | * | 10/1998 | Shank | 340/326 |
| 5,832,446 A | * | 11/1998 | Neuhaus | 705/1 |
| 5,838,798 A | * | 11/1998 | Stevens, III | 705/15 |
| 5,839,115 A | * | 11/1998 | Coleman | 705/15 |
| 5,845,263 A | * | 12/1998 | Camaisa et al. | 705/27 |
| 5,907,275 A | * | 5/1999 | Battistini et al. | 340/286.09 |
| 5,926,111 A | * | 7/1999 | Davis et al. | 340/825.63 |
| 5,937,386 A | * | 8/1999 | Frantz | 705/1 |
| 5,966,285 A | * | 10/1999 | Sellers | 361/686 |
| 5,969,968 A | * | 10/1999 | Pentel | 705/26 |
| 6,019,393 A | * | 2/2000 | Loebner | 283/60.2 |
| 6,049,780 A | * | 4/2000 | Fuyama | 705/15 |
| 6,072,393 A | * | 6/2000 | Todd | 340/568.2 |
| 6,087,927 A | * | 7/2000 | Battistini et al. | 340/286.09 |
| 6,088,681 A | * | 7/2000 | Coleman et al. | 705/15 |
| 6,133,830 A | * | 10/2000 | D'Angelo et al. | 345/571 |
| 6,137,409 A | * | 10/2000 | Stephens | 340/568.1 |
| D433,438 S | | 11/2000 | Wharram | D18/4.4 |
| 6,170,026 B1 | * | 1/2001 | Kimura et al. | 710/62 |
| 6,185,096 B1 | * | 2/2001 | Helot et al. | 361/686 |
| 6,208,976 B1 | * | 3/2001 | Kinebuchi et al. | 705/15 |
| 6,212,265 B1 | * | 4/2001 | Duphorne | 379/142.15 |
| 6,215,475 B1 | * | 4/2001 | Meyerson et al. | 345/173 |
| 6,220,883 B1 | * | 4/2001 | Helot et al. | 439/341 |
| 6,229,694 B1 | * | 5/2001 | Kono | 361/683 |
| 6,275,882 B1 | * | 8/2001 | Cheever et al. | 710/302 |
| 6,286,102 B1 | * | 9/2001 | Cromer et al. | 713/200 |
| 6,301,124 B1 | * | 10/2001 | Nikazm et al. | 361/799 |
| 6,327,575 B1 | * | 12/2001 | Katz | 705/16 |
| 6,341,268 B2 | * | 1/2002 | Walker et al. | 705/15 |
| 6,359,994 B1 | * | 3/2002 | Markow et al. | 381/333 |
| 6,366,196 B1 | * | 4/2002 | Green et al. | 340/286.09 |
| 6,441,808 B1 | * | 8/2002 | Hashimoto | 345/173 |
| 6,449,579 B1 | * | 9/2002 | Nikazm et al. | 702/122 |
| 6,473,739 B1 | * | 10/2002 | Showghi et al. | 705/26 |
| 6,553,386 B1 | * | 4/2003 | Alabaster | 707/104.1 |
| 6,594,502 B1 | * | 7/2003 | Koester | 455/414.1 |
| 6,636,835 B2 | * | 10/2003 | Ragsdale-Elliott et al. | 705/15 |
| 6,646,659 B1 | * | 11/2003 | Brown et al. | 345/811 |
| 6,973,437 B1 | * | 12/2005 | Olewicz et al. | 705/15 |
| 2001/0047301 A1 | * | 11/2001 | Walker et al. | 705/15 |
| 2002/0016739 A1 | * | 2/2002 | Ogasawara | 705/22 |
| 2002/0032667 A1 | * | 3/2002 | Walker et al. | 705/400 |
| 2002/0077843 A1 | * | 6/2002 | Halverson | 705/1 |
| 2002/0188495 A1 | * | 12/2002 | Banerjee et al. | 705/10 |
| 2002/0194129 A1 | * | 12/2002 | Furuya et al. | 705/41 |
| 2003/0088469 A1 | * | 5/2003 | Leifer | 705/15 |

FOREIGN PATENT DOCUMENTS

| | | |
|---|---|---|
| JP | 59-194262 | 11/1984 |
| JP | 61-180347 | 11/1986 |
| JP | 63-1799557 | 11/1988 |
| JP | 7-28887 | 1/1995 |
| JP | 8-44798 | 2/1996 |

OTHER PUBLICATIONS

Derfler, Frank J. et. al. How Networks Work, Millennium Ed., Que Corporation, Jan. 2000.*
Gralla, Preston, How the Internet Works, Millennium Ed., Que Corporation, Aug. 1999.*
Patent Abstracts of Japan, JP 58-137076, Aug. 15, 1983.
Patent Abstracts of Japan, JP 59-194262, Nov. 5, 1984.
Patent Abstracts of Japan, JP 7-28887, Jan. 31, 1995.
Patent Abstracts of Japan, JP 8-44798, Feb. 16, 1996.

* cited by examiner (a)

(b)

SERVICE MANAGING SYSTEM

FIELD OF THE INVENTION

The present invention relates to a service managing system which enables management of customers' orders not only at eating houses such as restaurants, family restaurants, saloons and fast food stores but also at karaoke rooms (sing-along music rooms), barbers, beauty saloons and so on when customers visit the foregoing places and leave there. The invention more particularly relates to a service managing system in which various pieces of information are exchanged using radio communications between terminals and various devices.

DESCRIPTION OF THE RELATED ART

Various attempts have been made in order to electronically process data concerning customers' ordered dishes, payment, food serving arrangement in a variety of eating houses such as restaurants, thereby improving management of service procedures and quality of service offered to customers.

For instance, Japanese Patent Laid-Open Publication No. Sho 58-137076 discloses a service managing system for restaurants, in which data, input using a table top terminal, is processed by a central processing unit and are transmitted to and indicated on displays at a kitchen and a worktable. Such systems are also disclosed in Japanese Patent Laid-Open Publications No. Sho 59-194262 and No. Hei 7-28887, and Japanese Utility Model Laid-Open Publication No. Sho 61-180347.

Japanese Patent Laid-Open Publication No. Sho 58-137077 discloses a service managing system for a restaurant, in which worktable terminals are of a wire-less type and carried by waiters or waitresses (hereinafter called the "employees"), and dishes to be delivered is notified to a CPU using radio communications, thereby reducing load applied to the employees dispensing with the installation of transmission cables, and facilitating reform of the restaurant. Further, Japanese Utility Model Laid-Open Publication No. Sho 63-179557 and Japanese Patent Laid-Open Publication No. Hei 8-44798 also disclose service managing systems using radio communications.

Existing service managing systems have suffered from the following problems when customers order their desired dishes themselves using wireless order terminals.

First of all, wiring is required in order to supply AC power. Further, a body of a store control unit is very large, gets in the gangways in the restaurant, and is very expensive.

The foregoing systems are based on a serial communication processing method using a single radio wave, so that customers have to wait when many wireless order terminals are simultaneously in operation.

The wireless order terminals are so large that they cannot be brought to tables occupied by customers, and are difficult for the customers to handle.

Those systems might be effective in improving service offered to customers if customers can operate order terminals in order to call a store clerk, a waiter or a waitress, or if it is possible to automatically recognize customers' states and notify them to store clerks, waiters or waitresses who are ready to serve the customers before they are called. Unfortunately, this kind of function has not been incorporated in service managing systems of the related art. Further, no communications are electronically established between customers and store clerks, waiters or waitresses who are far from one another, and between store clerks, waiters, waitresses, cooks, and other members of the store or restaurant.

In addition, the order terminals are embedded in tables, and are not visible when ordered dishes are placed on the tables.

A system where customers order their desired dishes by themselves using a portable wireless order terminal has the following problem.

It is impossible to correlate the data input by customers using order terminals and the data displayed on terminals carried by employees since the customer's table location is not known. Therefore, it takes time for them to reliably check the dish delivery data at respective positions.

Information such as visual menus or updating information having a large volume cannot be transmitted in bulk from central equipment in a store or a head office to respective branch offices.

Further, customers may not enjoy operating order terminals.

Customers at a counter cannot directly order dishes by themselves since order terminals are not provided at the counter.

SUMMARY OF THE INVENTION

The present invention is intended to provide a service managing system for stores or eating houses such as restaurants, which can overcome the foregoing problems of the related art.

With the service managing system of the invention, data are exchanged between all the terminals and various units using radio communications. The terminals are portable and driven by batteries without using any AC power source. The service managing system performs overall management of services, order of menus, cooking, food serving and accounting.

The service managing system also allows verbal communications through the use of personal handy phones (hereinafter called the "PHS"), which operates on a PHS wave, consumes a reduced power, and assures reliable digital communications.

A store control unit installed in a store or restaurant transmits image information concerning new menus, commercials and so on to all the terminals, thereby updating existing data. Further, the store control unit receives common information or the like from a head office in order to update existing data.

A guide display is provided at an entrance of the restaurant or the like and visually informs customers of availability of usable tables, time for them to be seated and so on. Further, the guide display is possible to automatically respond to customers' requests, issue order tickets, and guide customers to usable tables.

Table top terminals offer color indications of items which look real and are as clear as pictures. Viewing them, customers will be able to order desired items. The table top terminals are compact and thin, and stand along side edges of tables, so that they do not disturb customers. The table top terminals can be moved so as to face customers, be brought to hem, and be handled just like conventional menus. The terminals are battery-driven and cordless type.

When a customer operates the table top terminal in order to temporarily settle an account, this is notified to a terminal of a free, or unoccupied, employee. Then, the customer's account is transferred to an accounting section, so that the customer can pay without delay at a register.

The number of table top terminals can be increased or decreased in order to serve customers without delay by appropriately adjusting the number of wireless terminal connectors called CS (call station) units in accordance with the number of terminals and frequency of uses of the terminals depending upon a scale of the restaurant.

The service managing system allows automatic confirmation of a flow rate of customers, and automatic consultation on the number of part-timers and personnel to be increased or decreased, which are effective in improving total management of the store or restaurant.

The management of the store or restaurant is completely automated so that it is possible to collect data on the service activities throughout the store or restaurant. The names of employees, time and service items input on the store control unit are recorded, and are output in the form of tables. It is possible to recognize whether or not service is offered without any problem. If there is any problem, it can be easily detected, and be quickly overcome. Such data are usable as materials to evaluate the quality of service of the store or restaurant, and the efficiency ration of the employees.

Free, or unoccupied, store clerks or employees will be preferentially notified and dispatched to a customer who is operating a table top terminal.

Guidance for delivery of cooked dish is indicated on a worktable terminal, so that the cooked dish can be delivered to a specified table without any problem. Further, customers can check, on the table top terminals, the dish to be delivered, which is effective in enabling customers to be served with their desired dishes.

The service managing system can reduce manpower and improve quality of service offered to customers, so that advantages obtained by these factors can improve and refine dishes served to customers, which will contribute to future development of restaurants or the like.

Customers at a counter can order their desired dishes using counter top terminals.

Customers at ordinary tables can exchange E-mails using table top terminals, customers at a counter can do the same using counter top terminals, and customers at ordinary tables and those at the counter can exchange E-mail using table top terminals and counter top terminals.

The service managing system is provided with functions to create new menus using a digital camera, a scanner and so on. Further, recipes, information concerning calories of dishes, prices, standard cooking time, places where materials are purchased can be input and indicated on terminals.

The service managing system is applicable not only to restaurants or the like but also other service trades. For instance, the system is usable to manage the availability of usable spaces, ordering of food and drink, delivery of cooked dishes at karaoke rooms.

In addition, the system is applicable to barbers and beauty saloons in order to record histories of services offered to customers, data concerning hairdressers in charge of respective customers, and so on. When a customer visiting a barber or beauty saloon inputs various data using an order terminal, and specifies a desired hairdresser, a time period for the customer to wait will be automatically calculated and indicated on the order terminal. Further, a manager may select and introduce a free, or unoccupied, hairdresser to the customer.

The object and features of the present invention will become clear with reference to the following description of the preferred embodiment and accompanying drawings.

DESCRIPTION OF THE PREFERRED EMBODIMENT

Figure 1:
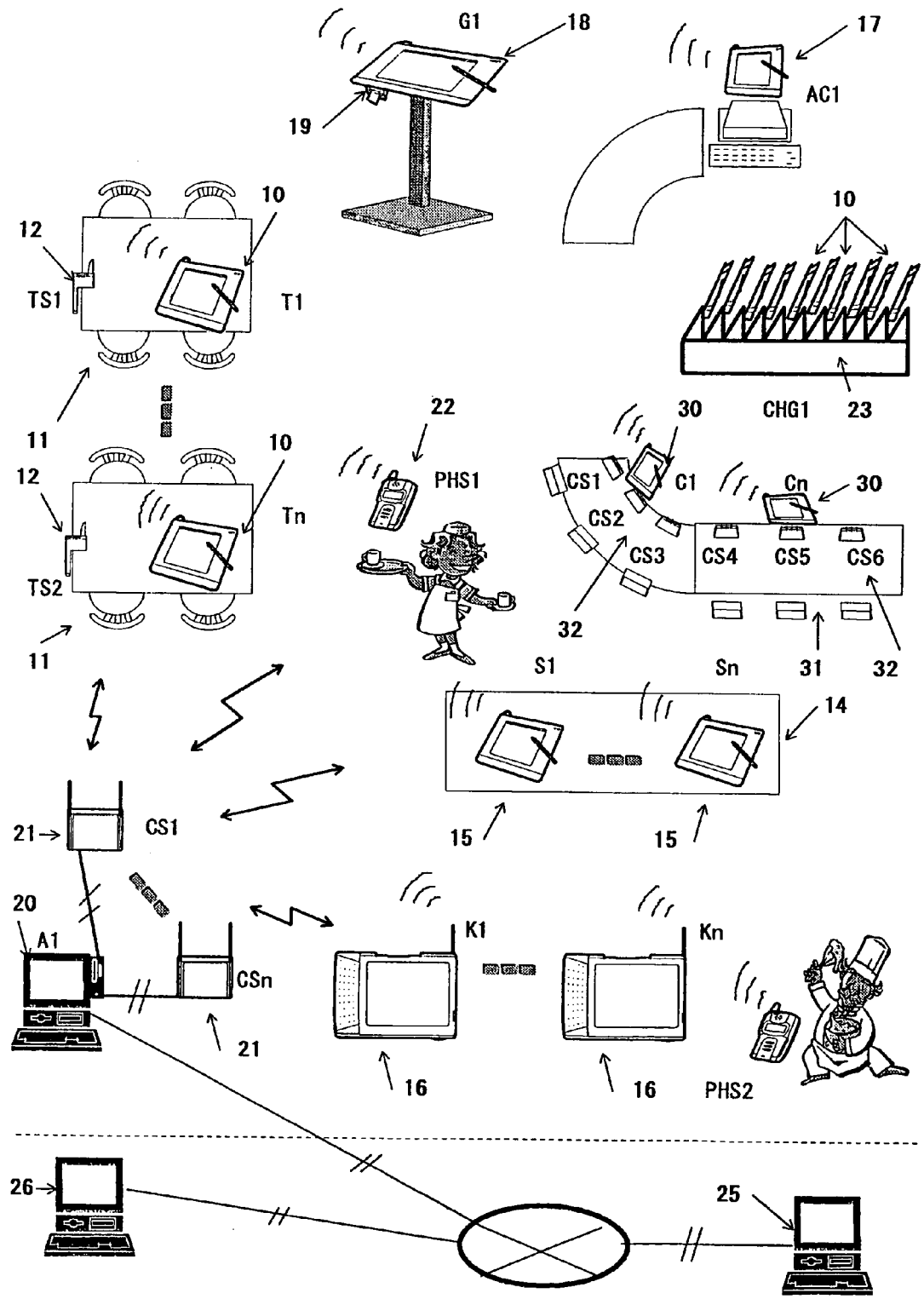
FIG. 1 is a view showing the concept of a service managing system of the invention.

An outline of a service managing system of the invention will be described with reference to FIG. 1. The service managing system comprises: a store control unit 20; a plurality of table top terminals 10; a plurality of counter top terminals 30; at least one worktable terminal 15; at least one kitchen terminal 16; a plurality of PHS terminals 22 carried by waiters, waitresses and cooks; an accounting unit 17; and a guide display 18.

The store control unit 20 exchanges various kinds of information between the foregoing terminals via CS units 21 for establishing radio communications. The number of the CS units 21 depends upon the number of the foregoing terminals. The table top terminals 10, counter top terminals 30, worktable terminal 15 and accounting unit 17 exchange data and verbally communicate one another using a personal handy phone system (PHS).

The table top terminals 10 are prepared for respective tables 11 in a restaurant, saloon or the like. A customer can view menu and order desired dishes using the table top terminal 10. Each table top terminal 10 is a compact, thin and portable terminal having a liquid crystal panel, for example, and is driven by a rechargeable battery. The customer can view indications on the table top terminal 10 just like viewing an ordinary menu. The table top terminal 10 is placed on a table terminal receptacle 12 provided on the table. Further, customers can call an employee using the table top terminal 10.

In the example shown in FIG. 1, the counter top terminals 30 and counter terminal receptacles 32 are provided at respective counter seats 31. The counter top terminals 30 are identical to the table top terminals 10. FIG. 1 shows that one counter top terminal 30 is used for a group of customers. When ordering desired dishes, customers place the counter top terminal 30 on the counter terminal receptacle 32.

The worktable terminal 15 is provided on a worktable 14 in order to indicate cooked but not delivered dishes as well as already delivered dishes.

Further, the kitchen terminal 16 is provided in a kitchen in order to indicate dishes before being cooked, dishes being cooked, and dishes already delivered to customers in different colors together with the employees' names, and names of the employees in different colors. The PHS terminals 22 are carried by the employees in order to allow verbal communications there between, if necessary.

When the customer informs of payment is made either via the table top terminal 10 or the counter top terminal 30, the accounting unit 17 casts accounts and displays and counted result on the table or counter terminal 10 or 30.

The guide display 18 indicates on the real time basis information concerning unavailability of vacant tables, locations of vacant tables, time required for allowing customers to be guided to vacant tables, and so on. The guide display 18 is provided with a ticket machine 19 for issuing order tickets.

The store control unit 20 also functions as a point of sales system (called the "POS" hereinafter), is connected to a central processing system 25 at a head office via an IP network or a dedicated line, and is accessible to control systems 26 at other branch stores.

The store control unit 20 will be described with reference to its main functions, configuration and operation.

Confirmation of Flow of Customers

The names of the employees, time of operation of terminals and data input using terminals are recorded and transferred to the store control unit 20. The store control unit 20 totals the foregoing data, tabulates them, and indicates them in the form of tables. Referring to the tables, it is possible to check whether or not services are being normally offered, or to locate abnormal situations. Therefore, such abnormal situations can be quickly overcome. The foregoing data are usable as materials for evaluating the restaurant itself or the efficiency rating of the employees.

(2) Controlling communications between terminals (3) Managing effective use of tables (4) Managing activities at the kitchen The store control unit 20 notifies the kitchen of the presence of dishes ordered but not cooked, dishes being cooked, cooked dishes, and unavailability of materials for ordered dishes.

(5) Managing delivery orders and tables to which cooked dishes are to be delivered (6) Managing calls from customers, and (7) Controlling exchange of data to and from the POS control center.

Figure 2:
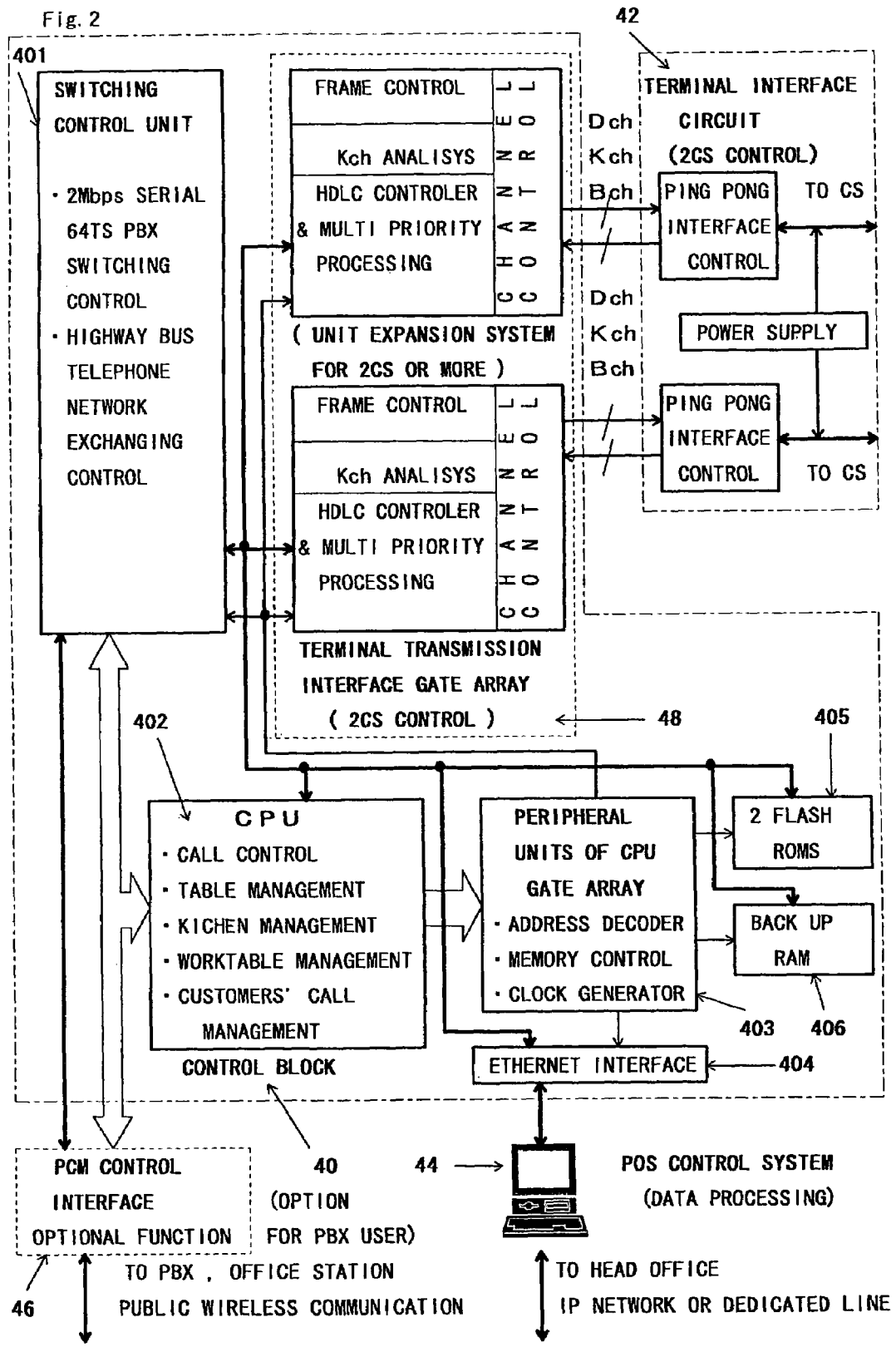
FIG. 2 is a block diagram showing the configuration of a store control unit in a branch office.

Referring to FIG. 2, the store control unit 20 includes: a control block 40 for controlling the overall activities in the restaurant or store; a terminal interface circuit block 42; a POS control system 44; and a PCM interface 46.

The terminal interface circuit block 42 physically connects the CS units for establishing radio communications between the terminals and the control block 40. The POS control system 44 is accessible to existing POS devices. The PCM interface 46 establishes connection to public communication networks. However, the PCM interface 46 is not always indispensable in the service managing system, is an optional device, and will be provided in response to customers' requests.

The store control unit 20 is also provided with a circuit for establishing intra-office communications between PHS terminals. A maximum of 32 CS units can be provided by expanding a pair of a terminal transmission interface gate array 48 and the terminal interface block 42. This enables the store control unit 20 to communicate with table 96 or counter top terminals 10 or 30 at the same time.

It is assumed here that direct communications are not established between the table and counter top terminals 10 and 30 although they are technically possible. Communications are basically allowed between the PHS terminals 22, between PHS terminals 22 and table top terminals 10, between the PHS terminals 22 and counter top terminals 30, and between the PHS terminals 22 and worktable terminal 15, kitchen terminal 16, and accounting unit 17.

The control block 40 includes: a switching control circuit 401 for connecting the foregoing terminals in order to allow verbal and data communications there between; terminal interface gate array 48 for controlling transmission and reception of information by synchronously analyzing data and verbal information transferred from the CS units via channels, and constituted by an LSI; a CPU 402 for controlling the whole activities in the restaurant or store; a peripheral units of CPU gate array block 403 peripheral to the CPU 402 being an LSI for connecting a peripheral LSI for the CPU 402; an Ethernet interface 404 for establishing data communication to and from the POS control system 44 using the Ethernet system; a flash ROM 405 having two program ROMs for controlling the control block 40 and a memory for storing visual data whenever there are data to be updated; and a backup RAM 406 for storing information which should not be erased at the time of emergency.

One program ROM is used for normal operation and the other program ROM is used as a backup at the time of emergency or maintenance.

The terminal interface circuit 42 enables radio communications between the CS units 21 and the PHS terminals 22, table top terminals 10, counter top terminals 30, worktable terminal 15, kitchen terminal 16 and counting unit 17. The terminal interface circuit 42 adopts a ping-pong interface for the communications to and from the terminals, and is connectable with two CS units. When this circuit 42 is connected in the shape of a hexagon, a maximum of 32 CS units are connectable. One CS unit enables simultaneous communications by three terminals, so that 32 CS units allow communications by 96 terminals at the same time.

The POS control system 44 receives accounting data from the control block 40, processes the received data, and transfers them to the head office at a totaling time everyday, so that all the branch stores can be centrally managed by the head office.

Further, the POS control system 44 is also used to manage food materials in a storehouse, and automatically order to related supply centers necessary materials depending upon seasons, days of the week and so on, via a concerned network. This management work is performed using a personal computer which is connected to the head office via the IP network or a dedicated line.

The PCM control interface 46 permits the PHS terminals to connect to outside parties via a public telephone network.

Figure 3:
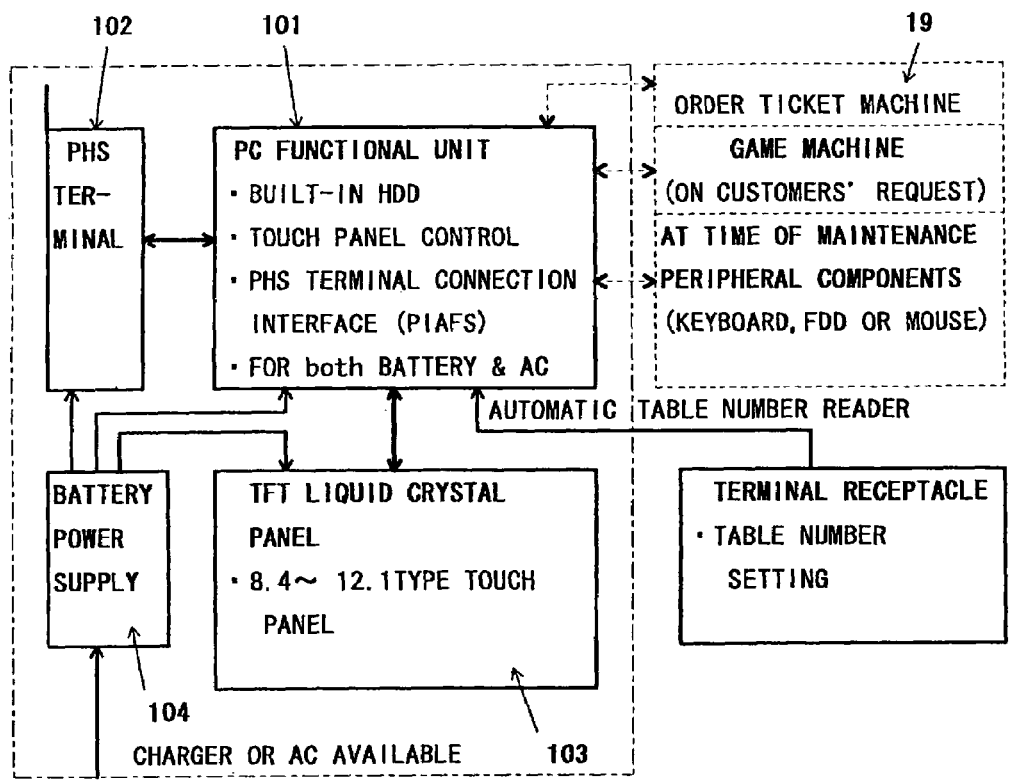
FIG. 3 is a block diagram showing the configuration of a guide display terminal.

The table top terminals 10, counter top terminals 30, worktable terminal 15, kitchen terminal 16 and guide display 18 are essentially identical and personal computers. Referring to FIG. 3, each of the foregoing terminals is mainly composed of a PC functional unit 101, a PHS terminal functional unit 102, a TFT liquid crystal panel 103, and a battery power supply 104.

The PC functional unit 101 functions as an ordinary personal computer, and includes: a PHS terminal connecting interface; a touch panel control; a game machine interface; a peripheral device interface; an automatic table number reader; and an order ticket machine 19.

The PHS terminal connecting interface permits and controls data communications between various units and terminals on the basis of a PIAFS system. The touch panel control enables data to be input on terminals by touching visual indications thereon. The game machine interface is used to connect the TFT liquid crystal panel 103 when it is operated as a game machine monitor. The peripheral device interface is connected to a keyboard, a mouse, FDD, CDR or the like at the time of maintenance. The automatic table number reader has an interface circuit for automatically reading a table number or a counter seat number when a table or counter top terminal is placed on a terminal receptacle. The order ticket machine 19 is provided with an interface to which a small printer is connected, and is attached to the guide display 18 in order to issue order tickets.

The PHS terminal functioning part 102 controls PHS radio communications.

The TFT liquid crystal panel 103 is clearly visible when viewed slantwise, and is a touch panel.

The battery power source 104 is continuously usable for approximately 15 hours (including a battery operation saving time) once it is charged. The battery power source 104 is required to be further light in weight.

Figure 4:
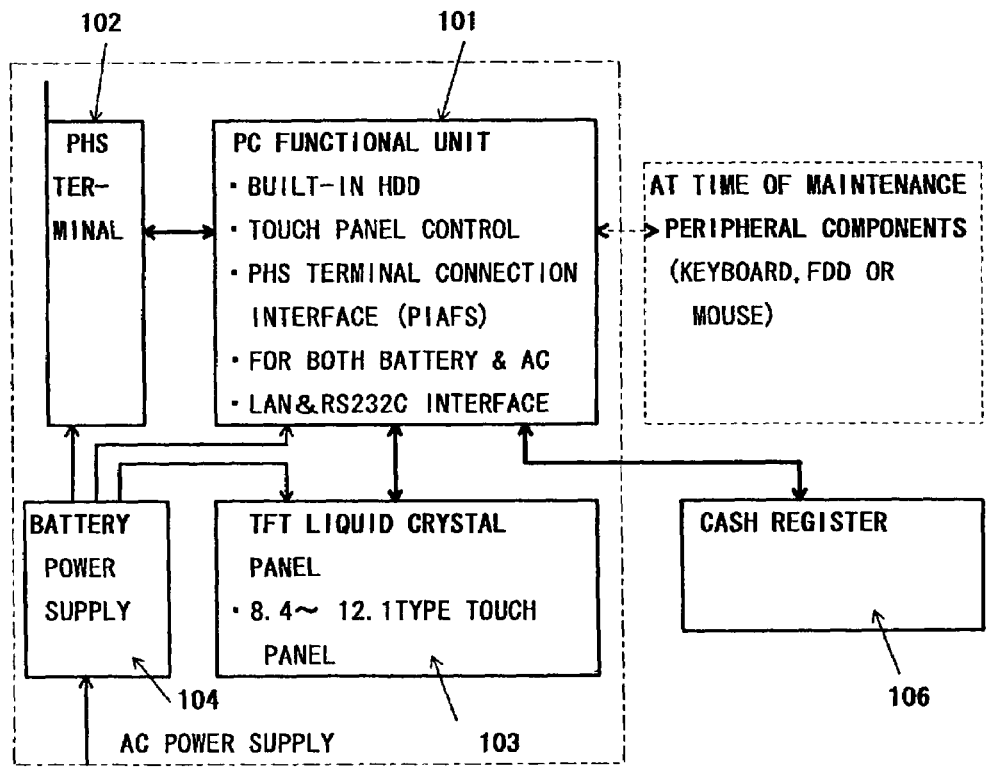
FIG. 4 is a block diagram showing the configuration of an accounting unit.

FIG. 4 shows the configuration of the counting unit 17 which is substantially identical to the foregoing terminals. However, the counting unit 17 is provided at its PC function part with a LAN & RS 232C interface in order to connect with a commercial cash register 106.

A centralized battery charging stand 23 is used to quickly and simultaneously charge batteries of ten or more terminals.

Table terminal receptacles 12 for the table top terminals 10 and counter terminal receptacles 32 for the counter top terminals 30 are provided with number reading parts for enabling table or counter top terminal to automatically read identification numbers of the table or counter seats.

The table top terminals 10 will be described with reference to their functions and operations.

Each table top terminal 10 is used for the following purposes: indicating menus for enabling customers to order desired dishes; broadcasting commercials; indicating questionnaires; inviting the use of game machines; offering quizzes to customers; indicating how to call and communicate with employees; and periodically providing current topics.

The table top terminal 10 indicates a variety of menus for senior people, young people, children, females, housewives and so on, and menus for rich taste and plain taste. This enables customers to select dishes as desired.

Further, menus are further classified with respect to fish, meat, vegetables, salads, rice, noodles, Japanese foods, Italian foods, pizza, pasta, beverages, stews, soups, and so on.

It is also possible to indicate the whole menus in a hierarchical manner, or menus showing calories and nutrients and so on.

Still further, the customers can review their ordered dishes and total calories of the ordered dishes.

In addition, it is possible to indicate recommended dishes on a particular day.

The table top terminal 10 also indicates on a real time basis a proposed time of delivery of the ordered dishes, and a state of the ordered dishes waiting to be delivered.

It is possible to indicate menus in the form which is easily understood and ordered by children using character figures popular to them, for example. Further, menus may be prepared for children and to adults.

Payment may be made by credit cards, cash, electronic money, or electronically made via portable phones.

A total fee for already served dishes may be indicated on the real time basis, with or without taxes.

Dishes before and after delivery are clearly indicated on the table top terminal 10.

Commercials of adjacent stores may be indicated on the table top terminal 10. Customers may view them, or stop them if they are disturbing.

Customers can call an employee via the table top terminal in case of an emergency.

It is also possible to give small presents to customers who answer questionnaires or quizzes when they make payment. Alternatively, it is possible automatically to discount customers' fees when they answer questionnaires.

The customer can communicate with the employee using the table top terminal 10, according to a procedure specified by employees. Customers and employees can be called by a visual or verbal signal which is determined by the CS unit.

Further, the customer can view popular topics concerning health, what is best, worst and so on, on the table top terminal 10.

In addition, it is possible to indicate goods using three-dimensional computer graphics.

The worktable terminal 15 functions as follows: a) visually indicating tables where cooked dish is to be delivered in order to enable even part-timers or beginners can understand them; b) permitting communications between employees; c) enabling smooth and reliable delivery of dishes by the employees; and d) indicating tables to be cleared. Further, the worktable terminal 15 is protected against water and bacteria.

Further, the worktable terminal 15 indicates cooked dish that has been delivered to customers and cooked dish that has not yet been delivered to customer. When proposed delivery of cooked dish is input on the worktable terminal 15, this is displayed in a different color on the table top terminal 10 where the cooked dish should be delivered. Then, completion of dish delivery is input on the table top terminal 10, and this is indicated on the worktable terminal 15 in a different color. Therefore, it is possible to prevent delivery of dish to wrong destinations.

The order of delivery is arranged in the time series of customers' orders. Therefore, dishes are reliably delivered to customers in accordance with the order of customers' orders.

The order of delivery is indicated on the worktable terminal 15 when a button associated with the cooked dish is touched.

The kitchen terminal 16 is operated by touching or a dedicated pen and indicates: a) non-cooked dishes, dishes being cooked and already cooked dishes for respective employees in different colors; b) dishes being cooked or cooked dishes in response to input from the PHS terminal 22; and c) that some of materials of dishes are out of stock in response to input from the PHS terminal 22, thereby notifying this situation to all the table top terminals. The item c) is effective in overcoming a problem that it is necessary to request a customer to re-order dishes after materials of the ordered dishes are found to be out of stock. This also contributes to reduction of loss time. The kitchen terminal 16 is waterproof and protected against bacteria.

Further, the kitchen terminal 16 indicates cooked dishes which are ready for delivery.

Information on materials being out of stock or dishes that cannot be served on a particular day is input in the kitchen terminal 16 using the touch panel or the like. This information is also indicated on the table top terminals 10, the counter top terminals 30 and the guide display 18, so that customers can view the most updated information.

A dish which is being cooked by one cook and the name of the cook are indicated on another kitchen terminal 16 using a particular color, so that it is possible to prevent the same dish from being prepared by a plurality of cooks.

The guide display 18 indicates: a) availability of vacant tables and time required for enabling customers to be seated; b) today's recommended dishes; c) positions of vacant tables and route guidance to those tables; and d) notifying the PHS terminals 22 that customers are being guided to vacant tables, so that employees can clear the tables before the customers arrive there, which is reported to the employee who notified a usable state of the table.

The guide display 18 has a large display screen, which indicates today's recommended dishes, the number of occupied tables, the number and time for customers to be seated, and so on.

When the number of new customers is input, the guide display 18 indicates vacant tables according to their hierarchical order, and verbal guidance is also offered.

If all the tables are occupied and queuing is specified, the ticket machine 19 issues an order ticket. When vacant tables are available for the specified number of customers, a particular order ticket number will be verbally notified. The customers having the notified order ticket touches a specified position on the guide display 18, so that the guide display 18 indicates the position of the usable table. If there are no idle employees, it is possible to select whether or not succeeding queuing should be performed depending upon the situation.

The accounting unit 17 casts customers' accounts, and stores information concerning kinds of customers. When payment is informed from the table top terminal 10 or counter cop terminal 30, the accounting and appropriate data are indicated on a display screen of the counting unit 17, and a cashier issues a machine-made or handwritten receipt.

Reviewing contents of answers to questionnaires, the information concerning kinds of customers will be amended. If there has been no information with respect kinds of customers, information is input. The kinds of customers are indicated by icons representing senior citizens, males, females, children and so on. The icons are touched on the display screen. The information concerning customers is transmitted to the control unit so as to be applied to various management activities of the restaurant.

The centralized battery charging stand 23 takes only approximately two hours to simultaneously charge batteries of at least ten table top terminals 10 and at least ten counter top terminals 30.

The table terminal receptacles 12 are rotatable in a direction facing customers, can be entered a table number, can receive AC input or be provided with a battery-charging function (which is an optional function), and can protect the table top terminals from falling down.

Specifically, each table terminal receptacle 12 is easily rotatable in a direction facing customers, and remains stationary at a specified position.

The table terminal receptacle 12 is provided with a switch for setting a table number.

All or some of the table terminals receptacles 12 may be operated by an AC power or be provided with the battery-charging function for the table top terminals 10.

Each table top terminal 10 and each table terminal receptacle 12 are connected using a special flexible cord having a key in order to prevent the table top terminal 10 from theft and from being broken when it falls down from the table.

The PHS terminals 22 issue commands to respective terminals by verbal or visual signals, and are light in weight and easy to handle. Employees can respond to commands without holding the PHS terminals 22 with hands, when they use ear phones and put them on arms or the like.

When an employee reports the store central control unit 20 of his or her idle state using the PHS terminal 22, he or she will receive instructions from the central control unit 20.

Usually, the employees carry the PHS terminals 22 with ear phones so that the PHS terminals 22 are invisible to the customers. This is because customers may feel uncomfortable when they see employees using PHS terminals 22 as usual. Further, employees' voices communicating via the PHS terminals 22 may be uncomfortable to the customers.

Figure 5:
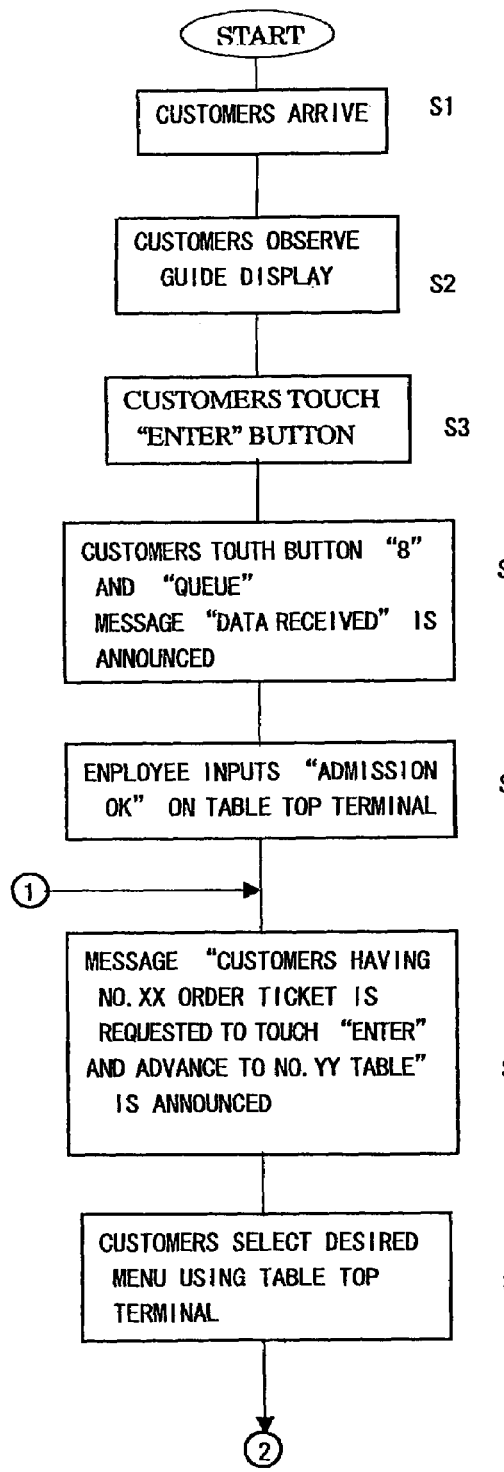
FIG. 5 is a flowchart of operations of the service managing system.
Figure 5:
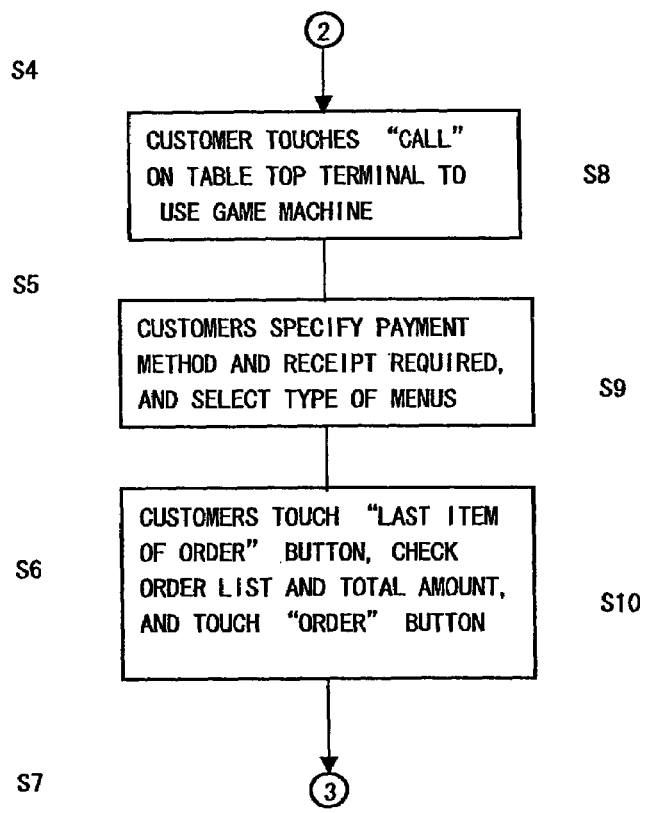
Figure 6:
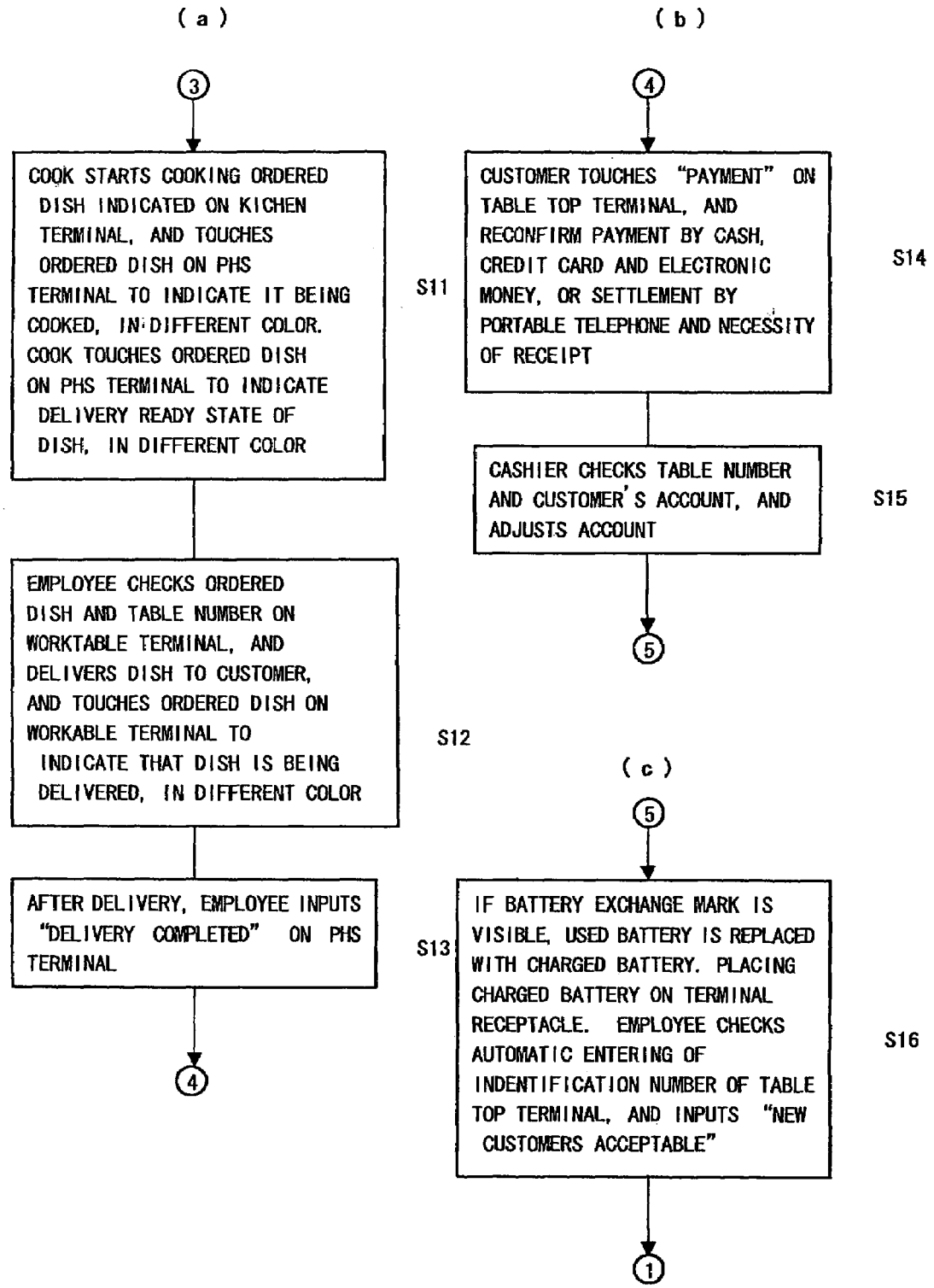
FIG. 6 is a continuation of FIG. 5.
Figure 7:
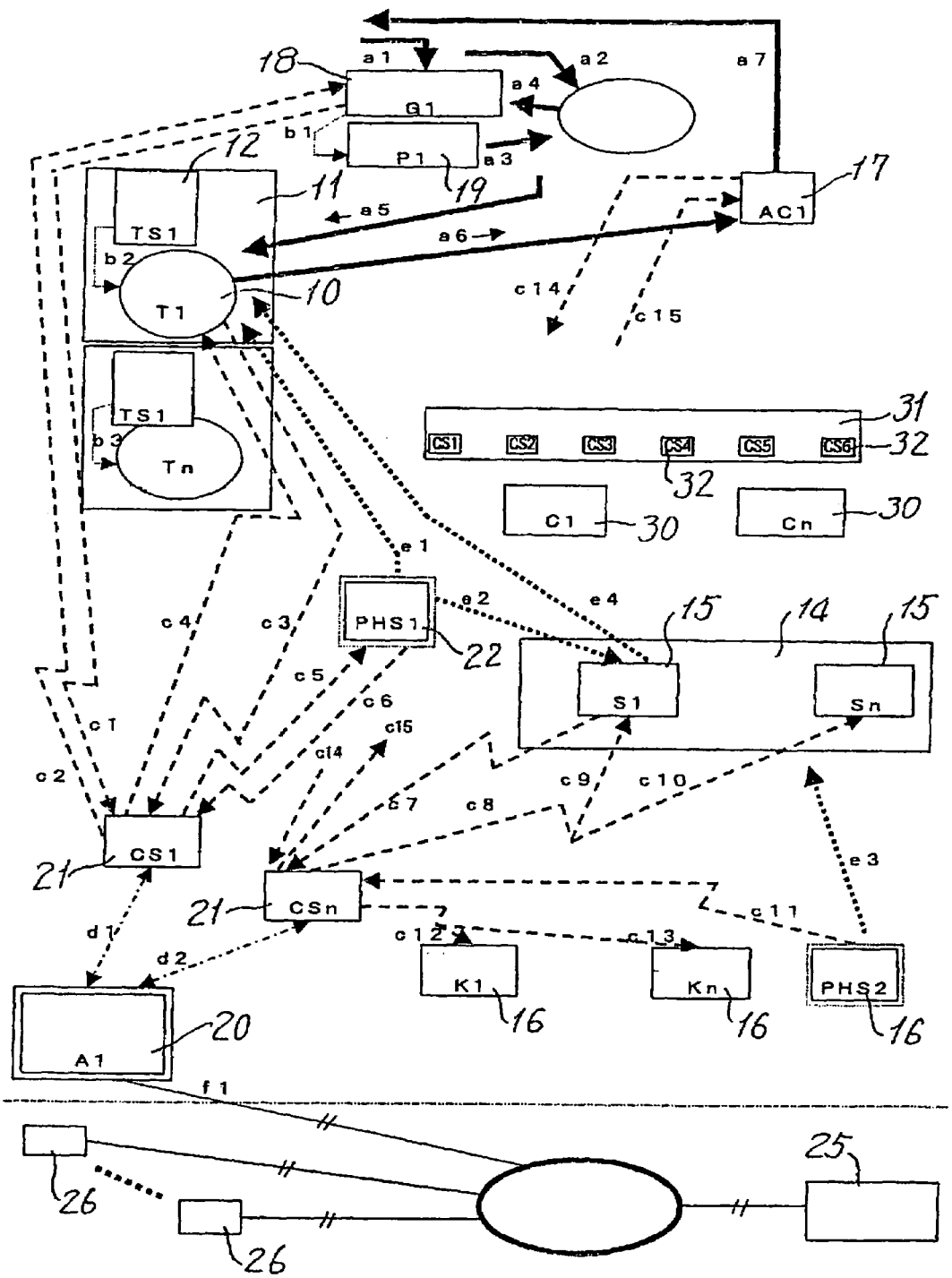
FIG. 7 is a schematic view showing routes for transmitting and receiving signals.

The service managing system operates in the following manner, as shown in flowcharts in FIGS. 5 and 6, and FIG. 7. It is assumed here that there is a group of customers consisting of six adults and two elementary school children. In FIGS. 5 and 6, S1, S2, . . . denote operation steps. In FIG. 7, a1, a2, . . . denote routes where customers move, b1, b2, . . . denote communications between terminals, c1, c2, . . . denote radio communications between terminals, d1, d2, . . . denote wire communications between terminals, e1, e2, . . . denote employees' movements, and f1, . . . denote communications with outside parties.

The customers get into the restaurant (step S1), and advance the route a1 to reach the guide display 18 (step S2). The customers review verbal or visual indications on the guide display 18 which shows the availability of vacant tables, waiting time, today's recommended dishes, and so on, and determine whether or not they dine there. Deciding to dine there, the customers touch a button on the guide display 18 (step S3). The guide display 18 shows a screen for selecting a table or counter. When the customers touch a table button, they are verbally or visually notified that "Please take an order ticket and wait until you receive a further announcement". At the same time, the presence of the customers is notified to PHS terminals 22 if there is a vacant table.

In step S4, a screen for specifying the number of customers is indicated on the guide display 18. When "8" is touched and a queue button is pushed, a message "Your data are received" is indicated visually or verbally. Sometimes, an inquiry message "May we guide you to separate tables?" is issued, for example. If all the tables are occupied and if the customer wishes to wait, the ticket machine 19 issues an order ticket. Receiving the order ticket, the customers will advance to a waiting room via a route a3.

When an employee inputs data on the PHS terminal 22, his or her name is automatically entered. However, when either a pen or touch panel is used for this purpose, the employee's name should be touched on the touch panel, first of all. This holds true to the succeeding operations.

When a table is cleared and is ready for new customers, the employee inputs "ready" state on the table top terminal 10 or the PHS terminal 22. A signal indicating the ready state is transmitted by the radio communication to the control unit 20 via an idle CS unit 21 and a route c3 shown in FIG. 7. Further, the identification code of the table top terminal 10 is read by the table terminal receptacle 12 via a route b2, and the customers' order is processed on the basis of the identification code. The employees can always check positions of vacant tables on the guide display 18, so that they can guide customers to usable tables.

The store control unit 20 lets via a radio route c2 the guide display 18 verbally announce "The customers having the order ticket No. XXX is requested to touch the ENTER button, and to come to No. YYY table" (step S6). The guide display 18 indicates the position of the table in question, and a select button for enabling the customers to select whether or not they receive service.

The customers come to the guide display 18 via a route a4, and pushes the ENTER button. The guide display 18 visually indicates the route to the tables in question to guide the customers. At the same time, the guide display 18 notifies this situation to the PHS terminals 22 via a wireless route c1, wire route d1 and wireless route c5. Receiving the notification, the employee reaches and greets the customers at the tables, and serves them. In this state, the employee may join the two tables if they wish. Then, the employee asks whether the customers' orders may be settled in a bulk. If so, the customers using No. 1 table top terminal 10 and those using No. 2 table top terminal 10 will be set as one group using the PHS terminal 22.

The guide display 18 indicates new customers a message "Please wait until the ticket machine issue a new order ticket".

The customers at the tables will review the menu screen on the table top terminals 10 in order to select their desired dishes (step S7).

The employee indicates on the table top terminal 10 that the customers are in a standby mode, using the PHS terminal 22. In addition, the employee urges the guide display 18 to issue a next order ticket via a wireless route c6, a wire route d1 in one roundtrip and a wireless route c2, using the PHS terminal 22.

If the employee cannot do the foregoing operation, the request for a next order ticket will be notified to the guide display 18, via a wireless route c3, wire route d1 in a roundtrip and wireless route c2 when the customers operate the table top terminal 10.

Further, the identification code of the table top terminal 10 is read from the terminal receptacle 12 via the route b2. The customers' orders and account will be processed on the basis of the identification code of the table top terminal 10.

The table top terminals 10 are designed for enabling customers to enjoy games. If children wish to play games in step S8, a "Call" button will be touched to call an employee via the PHS terminal 22. A plurality of employees may be called in this case. The called employee answers and indicates "Please wait" on the table top terminal 10, using the PHS terminal 22, and checks which table is calling. The employee comes the calling table, verifies the customers' wishes to play a game, and enables the use of a game machine.

Even when any employee does not attend the table, the customers can operate the table top terminal 10 in order to select a method of payment, and specify necessity or non-necessity of receipts, kinds of menus, or a three-dimensional graphic menu, and so on.

The customers can select payment by cash, credit cards, electronic money cards, or portable phone settlement when leaving the restaurant.

A plurality of menus are prepared according to kinds of customers, kinds of dishes, kinds of materials, and types of dishes. The menus are prepared for dishes suitable for senior citizens, those for young people, those for children, those for women, and those for housewives. The menus are classified into rich and plain dishes. The kinds of materials are fishes, meat, vegetables, salads, rice, and noodles. The types of dishes are Japanese dishes, Italian dishes, pizza, pasta, beverages, stew, and soup.

Calories, nutrients and so on of the respective dishes can be checked by the customers. It is also possible to calculate calories of ordered dishes and indicate them on the table top terminal 10.

The dishes can be also indicated by three-dimensional computer graphics if necessary.

The table top terminal 10 also indicates proposed delivery time of ordered dishes, which are calculated on the number of dishes to be cooked and other factors.

A sum of currently ordered dishes is indicated on the table top terminal 10 on the real time basis.

The number of respective dishes which can be served to customers is stored in the service managing system beforehand. If the number of the dishes to be served comes near the specified value, a mark representative of possible sellout will be indicated. Then, a sellout mark will be displayed when there is no available dish.

In step S10, the customer check the last item of their orders. If there is no change or no omitted order, the order list and the sum of ordered dishes are compared. Then, the customer touches "Order" button on the table top terminal 10 in order to confirm the final order.

Data on the ordered dishes are transmitted to No. 1 to n kitchen terminals 16 in charge of the ordered dishes, via the wireless route c3, wire route d1, wire route d2, and wireless routes c12 and c13.

The customers can select or operate the following items using the table top terminal 10: a) re-order; b) indication of weekly mini-information; c) commercials; d) answers to questionnaires; e) playing games; and f) challenging quizzes.

The customers can select commercials of adjacent stores or shops or general commercials.

When the questionnaires are selected, quality of dishes and offered service are indicated using comical images. Small gifts or discount of service will be offered to answerers.

Children can enjoy playing games when their agree with the games. The games will be charged or will be free. In the former case, fees will be indicated on the table top terminals 10.

When no date are input on the table top terminal 10 for a specified time period, the screen of the table top terminal 10 will become blank in order to save battery consumption. However, screens indicating re-orders, commercials, questionnaires, use of the game machine will be periodically displayed in a manner such that they are not uncomfortable to the customers. Further, the customers can request not to display any images.

In step S11 shown in FIG. 6, a cook prepares a dish ordered on the kitchen terminal 16. At first, the ordered dish is indicated in red on the kitchen terminal 16. The cook specifies the ordered dish using the PHS terminal 22 via a wireless route c11, wire route d2 in two roundtrips, wireless routes c12 and c13, and wireless routes c8, c9 and c10, so that the dish being cooked is indicated in blue on the kitchen terminal 16, for example. When the dish is completed, the cook inputs the completion using the PHS terminal 22. This information is transmitted to the kitchen terminals 16 and worktable terminals 15 via the wireless route c11, wire route d2, wireless routes c12 and c13, and wireless routes c8, c9 and c10. The information is indicated in white on the kitchen terminals 16 and worktable terminals 15. Further, the information is transmitted to the PHS terminals 22 of employees at the worktable, and is indicated on the table top terminal 10 via the wire route d1 and wireless route c4.

The cook carries the completed dish to the worktable 14 via a route e3, and issues a delivery ready command on the PHS terminal 22 via the wire route d2, and wireless routes c8, c9 and c10. Then, the ordered and cooked dish is indicated in yellow on the worktable terminals 15, for example.

In this state, the store control unit 20 automatically looks for a free, or unoccupied, employee, and notifies delivery ready information to the PHS terminals 22 carried by the employees.

When observing the indication on the PHS terminal 22, the employee checks the cooked dish with reference to the specified dish and table number on the worktable terminal 15. The employee receives the cooked dish via a route e2, and inputs data indicating delivery of the cooked dish on the worktable terminals 15 via a wireless route c6, wire route d1, wire route d2, and wireless routes c8, c9 and c10. The dish under delivery is indicated in blue on the worktable terminals 15, and is also indicated on the table top terminal 10.

If an inexperienced employee cannot locate the table on the basis of the table number, he or she touches a particular position on the worktable terminal 15. Then, the destination of the cooked dish is indicated in a particular color.

In step S13, the employee delivers the cooked dish to the destination via the route e4, and inputs the completion of delivery to the table top terminal 10. This information is transmitted from the PHS terminal 22 to the worktable terminal 15 via the wireless route c6, wire route d1, wire route d2, wireless routes c8, c9 and c10, and wireless route c4. The dish on the worktable terminal 15 is now indicated in green. Further, this is informed to the table top terminal 10.

It is possible to know whether or not all the ordered dishes have been delivered by observing color indications on the terminals.

After dining, the customer touches a "Payment" button on the table top terminal 10 in order to have their accounts cast. The accounting unit 17 calculates the account via the wireless route c3, wire route d1, wire route d2, wireless route c15 and wireless route c5, and waits for the customers. At the same time, a free, or unoccupied, employee will be selected in order to inform that the customers wish to pay, on the PHS terminal 22. Then, the employee guides the customers to the cashier. Information concerning payment by cash, credit card, electronic money and portable phone, and necessity of issuance of receipt is again confirmed, or specified again.

In this state, the customers are requested to check the method of payment, and confirmation data are transferred to the accounting unit 17. Then, a machine-made receipt or handwritten receipt will be issued. Information concerning the customer leaving the restaurant is notified to the employees carrying the PHS terminals 22.

The customers advance to the cashier via a route a6. In this state, the cashier confirms by observing the accounting unit 17 the presence of the table top terminal 10 on the table terminal receptacle 12 on the table 11.

In step S15, the cashier checks the table number, customers and account, and take steps for payment. When the account has been settled, the table top terminal 10 will be returned to a standby mode.

The cashier reviews various pieces of information indicated thereon, confirms answers to questionnaires, and updates the stored data. If no data have been input, data will be input.

A series of operations at the restaurant, e.g. arrival of customers, selection of menus, orders of dishes, delivery of cooked dishes and accounting, types of customers, and time required to serve the ordered dishes are computed and stored in the store control unit 20. The stored data are controlled by POS control system or the like.

Further, the store control unit 20 provides the computed accounting data to the POS control unit, which processes the received accounting data. The processed data are transmitted to the head office at a totaling time everyday, and are collectively managed there.

Further, supply of food materials is also managed at the head office and is automatically notified to the branch offices using the network, taking conditions such as seasons, a day of the week and so on into consideration.

After clearing the table, the employee checks the battery, and replaces another charged table top terminal 10 if a battery exchange mark is visible (step S16). Then, he or she places the table top terminal 10 on the table terminal receptacle 12, and checks whether or not the identification code of the table top terminal 10 is automatically input by directly operating the table top terminal 10 or using the PHS terminal 22. Thereafter, the employee sets "Table is ready for new customers" on the table top terminal 10 or PHS terminal 22 in order to notify this to the guide display 18 via the wireless route c6, wire route d1, wireless route c4 and wireless route c2.

The guide display 18 returns to the foregoing step S16 when there are new customers, or to the step S6 if there is no new customer.

Figure 8:
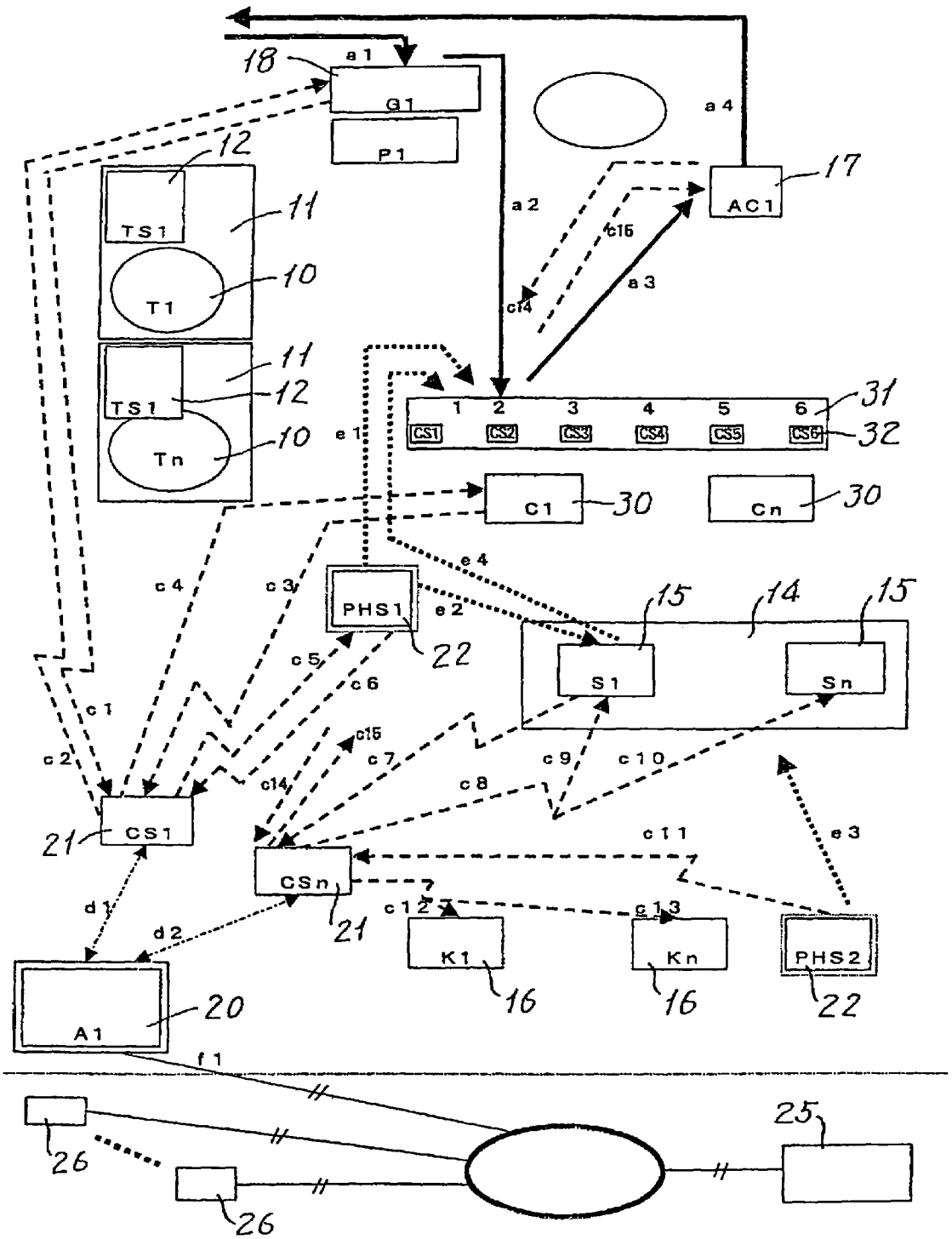
FIG. 8 is a schematic view showing further routes for transmitting and receiving signals.

The invention has been described concerning the case where the customers use ordinary table seats. The invention is preferably applied to customers seated at the counter. The following describes the operation of the invention when it is applied to customers at the counter seats, with reference to FIG. 8. The operations which are common to the foregoing description are described in a simplified manner, and the operations particular to the counter are mainly referred to hereinafter.

A customer reaches the guide display 18 via the route a1, and touches an "Enter" button thereon. Then, the guide display 18 indicates a screen for selecting a table or counter. If the customer touches a "Counter" button, the display visually indicates the route to the counter 31 in order to guide him or her. At the same time, the guide display 18 notifies PHS terminals 22 that the customer is coming to the counter 31. In response to the notification, one of the employees operates the PHS terminal 22 in order to indicate that he or she will attend the customer. Then, the employee comes to the customer in order to attend the customer, via the route e1.

The employee places an idle counter top terminal 30 on the counter terminal receptacle 32 on the counter 31, and operates the PHS terminal 22 in order to indicate that the customer is ready for ordering. This state is also notified to the store control unit 20 via a wireless route c14 and a wire route d1. The store control unit 20 performs various operations such as checking full state of tables.

Even if no employee comes to attend the customer, he or she can operate the counter top terminal 30 in order to specify a method of payment, necessity or non-necessity of a receipt, and a desired menu.

Thereafter, the customer selects his or her desired dishes by viewing a number of menus.

The customer touches the "Order" button on the counter top terminal 30, and ordered menus are notified to a particular kitchen terminal 16 via the wireless route c3, wire route d1, wire route d2, and wireless route c12 and c13.

Thereafter, the customer can operate the counter top terminal 30 in order to review commercials and topics, play games, or to order additional dishes.

The cook in charge of the ordered dish starts to prepare it. At first, the ordered dish is indicated in red on the kitchen terminal 16, for example. When the cook enters the start of preparing the dish on the PHS terminal 22, this is informed to the kitchen terminal 16 via the wireless route c11, wire route d2, wireless routes c12 and c13, and wireless routes c8, c9 and c10, so that the red indication on the kitchen terminal 16 changes to blue, thereby indicating that the dish is being prepared.

When the cook enters completion of the dish on the PHS terminal 22, this is informed to the kitchen terminal 16 via the wireless route c11, wire route d2, wireless routes c12 and c13, and wireless routes c8, c9 and c10. Then, color indication of the ordered dish is changed to white from blue. The completion of the ordered dish is also informed to the counter top terminal 30 via the wire route d1 and wireless route c4.

The cook brings the completed dish to the worktable 14, and operates the PHS terminal 22 in order to notify delivery ready state of the dish to the worktable terminal 15. On the worktable terminal 15, the color indication of the ordered dish is changed to yellow, for example. At the same time, the store control unit 20 automatically looks for a free, or unoccupied, employee. The delivery ready state is informed to the PHS terminal 22 of the free, or unoccupied, employee with preference via the wire route d1 and wireless route c5.

The employee receives the prepared dish, and notifies the delivery of the dish to the counter top terminal 30 via the wireless route c6, wire route d1, wire route d2, wireless routes c8, c9 and c10, and wireless route c4. The color indication of the dish is changed to blue, for example, on the worktable terminal 15.

After delivering the ordered dish to the customer at the counter 31, the employee inputs the end of delivery to the counter top terminal 30. The end of delivery is also informed to the worktable terminal 15 from the PHS terminal 22 via the wireless route c6, wire route d1, wire route d2, wireless routes c8, c9 and 10, and wireless route c4. The color indication of the dish is changed to green, for example, on the worktable terminal 15. Further, the counter top terminal 30 shows the end of delivery.

The customer touches the "Accounting" button on the counter top terminal 32 when leaving the restaurant after the meal. Receiving the accounting request via the wireless route c7 and wire route d1 in two roundtrips, the accounting unit 17 performs accounting, and waits for the customer. At the same time, a free, or unoccupied, employee is called and is notified on the PHS terminal 22 to guide the customer to the cashier. The customer pays in the same manner as that mentioned previously.

The counter top terminals 30 are placed on counter terminal receptacles 32 on the counter 31. The table top terminals 10 may be also used for the counter seats. Further, both the table top terminals 10 and counter top terminals 30 are simultaneously used for the counter seats.

If placed on the terminal receptacles 12 or 32 when the restaurant opens, the table or counter top terminals 10 or 30 are put into operation mode.

If the table or counter top terminal 10 or 30 is off from the table or counter top terminal receptacle 12 or 32 for a certain time period, such a state will be alerted by sound, light, a display screen or vibrations.

It is possible to know the state of all the table or counter top terminals which are placed on their receptacles.

Electronic mails may be exchanged between the table top terminals 10, between the counter top terminals 30, or between the table top terminals 10 and the counter top terminals 30. This may promote communications between customers. However, such communications should be directed to particular terminals in order to establish orders. Further, they may be established using some acceptable messages which have been prepared beforehand. Called customers can freely determine whether or not they accept calls. It is possible not to connect calls to the customers who do not wish to receive them, until new customers are seated at the table where the communication has been rejected. Alternatively, it is also possible to disable all the table or counter top terminals to receive calls.

The table and counter top terminals 10 and 30 can be designed in order to indicate television images, reproduced VTR images, or some other images. Customers may enjoy any of them until their ordered dishes are delivered.

Further, the table and counter top terminals 10 and 30 can indicate information concerning food materials such as areas producing materials, suppliers, products obtained without using agricultural chemicals, products obtained using organic chemicals.

The embodiment of the invention may be advantageous to the restaurant owner, for example, in the following respects: a) an income may be increased because game fees can be collected; b) fees for displaying commercials can be collected; c) the customers' accounts can be automatically sent to the counting machine; d) menus and various service information can be collectively updated or processed by the central control unit; e) information concerning insufficient stock of materials or sellout dishes can be indicated when customers order their desired dishes; and f) delivery of ordered dishes to customers can be easily notified by the PHS terminals, using the dedicated pen or touching the panel on the worktable terminal 15.

The employees can know whether or not all the ordered dishes have been delivered to customers. Delivery of the cooked dishes is notified by interrupting an existing screen image when touching the panel or using the dedicated pen. In other words, this delivery notification is indicated on the worktable terminals 15, by interrupting an existing screen image. Further, this notification is input by the PHS terminals 22 which are far from the worktable terminal 15.

Commercials sponsored by adjacent shops or stores may be indicated on the table or counter top terminals. Usually, the commercials are indicated as still images using image signals stored in a built-in memory. When existing images are updated, new image signals will be collectively transmitted to all the terminals from the CS units. It is possible to collect data concerning the number of customers observing the commercials, time period of the commercials, frequency of the commercials, and data on commercial reading. Commercial fees may be charged to sponsors on the basis of the foregoing data. Commercial fees may be used for rental fees of the service managing system of the invention.

In an emergency, customers can call employees using the table or counter top terminals. The employees can check where the emergency call is originated. It is possible to indicate on a large screen the table from which the emergency call has been originated.

The present invention is further advantageous in the following respects: the terminals can remain active during business hours when they are charged once everyday; and the terminals are water-tight and protected against bacteria.

The charged terminals are continuously usable for longer than 15 hours. When the restaurant is closed, the terminals may be charged by the battery chargers 23.

A table top terminal 10 whose battery is run down will be promptly replaced with a charged table top terminal 10. The identification number of the used table top terminal 10 will remain active until the new table top terminal is placed thereon. Therefore, when placing the new table top terminal 10 on the table terminal receptacle 12, the employee calls the new table top terminal 10 using the PHS terminal 22 in order to check whether the new table top terminal 10 reads the identification code of the table terminal receptacle 12 and shows it correctly.

If many customers come as one group and tables are linked, account of a plurality of table or counter top terminals 10 or 30 can be processed in bulk if requested.

The service managing system of the invention is applicable not only to ordinary eating houses but also to (1) take-out lunch stores, fast food restaurants such as hamburger shops, drive-through type fast food stores, eating houses in railway stations or the like, (2) lunch catering stores, and (3) karaoke houses.

In the first case, customers operate menu input terminals in front of the store and order desired items. A kitchen terminal and an accounting unit are operated in response to the operation of the foregoing menu input terminals. In case of a fast food restaurant, employees also carry menu input terminals in order to quickly meet customers' orders. The employees' menu input terminals are provided with accounting units as an integral part. Data are exchanged between the menu input terminals, counting machines and kitchen terminals using radio communications. In case of the drive-through type store, menu input terminals may be connected to a store building using chains. In the eating house at railway stations, menu input terminals may be installed in vending machines. Data are transmitted to kitchen terminals which also function as an accounting unit.

With the second case, after receiving orders from customers using wire communications, the service managing system will be used.

In the third case, the service managing system can be used to indicate vacant rooms, manage customers' orders, and settle customers' accounts. Since no new wiring is necessary for installing the service managing system, karaoke houses may be newly made or hotel facilities may be reformed as karaoke houses at a reduced cost.

In a karaoke house or the like where usable time is determined beforehand, remaining time which becomes less than a predetermined value is informed to customers using customer terminals. The customers may operate the terminals to prolong the usable time or stop their orders. This is effective in improving service quality.

Terminals in a waiting room or those on particular tables may be connected to TV networks or CATV networks in order to view TV or CATV programs.

The service managing system of the present invention is applicable to any service trades as well as to eating houses. Customers can review service items and order items as desired. The service managing system comprises: the portable order terminals operated by batteries; the order receiving terminals for receiving customers' orders and indicating them; the counting machine for calculating customers' accounts in response to requests from the order terminals; and the control unit for exchanging data between the order terminals, order receiving terminals and accounting unit, using radio communications. In this arrangement, the order receiving terminals preferably notify the order terminals that ordered service items are ready and can be offered to the customers.

It is possible to add the following functions to the service managing system of the invention.

When the service managing system is connected to an internet, outside customers use their terminals to get access to this system and check availability of vacant tables. Customers may visit the restaurant after confirming that there is a vacant able. Further, if appointment is made via the internet, this will be convenient to both customers and the restaurant, and leads to improvement of service quality.

If orders input using the table or counter top terminal can be verbally repeated, it is possible to check them and to reduce problems that delivered materials are different from the ordered materials.

The service managing system is used to manage stored goods for respective items, and indicate on the terminals out-of-stock items.

When an image input device is added to the service managing system, it is possible to prepare menus using images obtained by the image input device. In such a case, each branch office can create its own menus. If the service managing system is connected to a POS system, the menus created by the head office will be simultaneously transmitted to branches.

In addition to the foregoing description, the service managing system is advantageous as follows.

(1) Since the terminals are of cordless type, customers can take the terminals in their hands similarly to ordinary menus, and can review menu information easily in a joyful manner.

If necessary, the menus can be offered as three-dimensional computer graphics, customers can review them as if they observe actual dishes, which is effective in attracting more customers.

(2) This system uses PHS so that customers can get easy access to employees.

(3) This system can update information such as menus, mini-information, broadcasting commercials, game and quizzes from the central processing unit.

(4) When connected to the POS system, the head office and branch offices can exchange information common to them and information related to stores in each area, and can quickly and simultaneously update image information.

(5) This system manages all the tables. The guide display is provided at the entrance of the restaurant or the like, and visually informs customers of availability of usable tables, time for them to be seated and so on. The guide display guides the customers to usable tables.

(6) When a customer operates the table top terminal in order to temporarily settle an account, this is notified to a terminal of a free, or unoccupied, employee. Then, the customer's account is transferred to the accounting section, which enables the customer to pay without delay.

(7) Since customers' orders are indicated in accordance with their order time, problems that orders are treated in an arbitrary order can be prevented.

(8) No print slips are necessary since ordered dishes are confirmed by touching indications on the kitchen terminal, or dishes being cooked or already cooked dishes can be indicated by operating the PHS terminals.

(9) If ordered dishes or ordered items cannot be delivered to customers in an emergency, this is simultaneously informed to the all the terminals from the order receiving terminal or kitchen terminal. If misunderstanding occurs, cancellation of orders and apologies therefore can be indicated visually or verbally on the terminals.

(10) When some customers feel troublesome to operate table or counter top terminals, or do not want to understand how to operate them, the employee can receive their orders with the customers reviewing them on the employee's terminal. Therefore, order errors can be prevented, so that the service managing system can be utilized without any problem.

(11) The employees can respond to orders originated by customers at tables outside the restaurant. The service managing system is effectively used in saloons and restaurants having compartments.

(12) In future, it is expected that cooking processes will be accelerated in response to technical advancement of frozen materials, so that usability of the service managing system of the invention will be further increased. Therefore, cooking, delivery of cooked dishes, and cleaning of tables will be carried in an optimum manner when these works are performed in cooperation, which will lead to increase of sales.

What is claimed is:

1. A service managing system, comprising:
   a portable table top terminal that enables customers to view menus and to order a desired dish, being driven by a battery, and including a number reading part;
   a kitchen terminal that receives and indicates a dish ordered from the portable table top terminal;
   an accounting unit that manages accounts in response to customers' requests input into the portable table top terminal by the customer, and indicates calculated results;
   a control unit that processes data between the portable table top terminal, the kitchen terminal, and the accounting unit, and
   a terminal receptacle including an identification number, provided at least one customer location and, the terminal receptacle receives the portable table top terminal thereon, and the number reading part reads the identification number when the portable table top terminal is placed onto the terminal receptacle, wherein
   the portable table top terminal processes a customer's order on the basis of the identification number, and the control unit manages the occupancy of the at least one customer location based on the identification number, and
   data are transmitted and received using radio communications between the portable table top terminal, the kitchen terminal, the accounting unit, and the control unit.

2. The service managing system of claim 1, wherein information indicating cooked dishes is input on the kitchen terminal and is transmitted to the portable table top terminal for indication thereon.

3. The service managing system of claim 1, further comprising:
   a worktable terminal that indicates a table to be served in response to the information indicating the cooked dishes.

4. The service managing system of claim 1 further comprising:
   a guide display that indicates at least vacant tables.

5. The service managing system of claim 4, wherein the guide display also indicates a route to a vacant table and usable time thereof.

6. The service managing system of any one of claims 1 to 5, wherein a personal handy phone system (PHS) is used to exchange data and enable verbal communications.

7. The service managing system of claim 1, further comprising:
   a head office terminal that transmits visual indications of new menus or commercials to the portable table top terminal.

8. The service managing system of claim 1, wherein the portable table top terminal comprises:
   a flat display panel.

9. The service managing system of claim 2 or 3, wherein the portable table top terminal and the kitchen terminal recognize an employee terminal operator name and a terminal identification number.

10. The service managing system of claim 2 or 3, wherein the portable table top terminal and the kitchen terminal input a terminal employee name and a terminal time of input.

11. The service managing system of claim 1, wherein the portable table top terminal is used at a counter as a counter top terminal.

12. The service managing system of claim 11, further comprising:
   a counter top terminal receptacle provided on top of the counter at a location of a counter seat, having a counter top terminal receptacle identification number, and receives the portable table top terminal thereon, and the portable table top terminal is ready for use when placed on the counter top terminal receptacle, wherein
   the portable table top terminal reads the counter top terminal receptacle identification number when placed on the counter top terminal receptacle, and further processes a customer's order on the basis of the counter top terminal receptacle identification number.

13. The service managing system of claim 12, wherein the table top terminal emits an alarm when the table top terminal is not placed on one of the counter top terminal receptacle and the table top terminal receptacle for a predetermined period of time.

14. The service managing system of claim 11, wherein electronic mails are exchanged between a plurality of table top terminals, between a plurality of counter top terminals, or between the table top terminal and the counter top terminal.

15. The service managing system of claim 1, further comprising:
   an internet or a communications network connection that enables customers to check an availability of a service item or a presence of vacant tables via an exterior customer terminal.

16. The service managing system of claim 11, wherein the table top terminal or the counter top terminal comprise a visual display.

17. The service managing system of claim 1 further comprising:
   a connection to a point of sale network (POS), that transmits sales data from a head office to update an existing menu.

18. The service managing system of claim 1, wherein the table top terminal displays out-of-stock items.

19. The service managing system of claim 1, further comprising:
   an order status device that indicates when ordered items are not available to the portable table top terminal, the kitchen terminal, or an external terminal.

20. The service managing system of claim 1, wherein
   the kitchen terminal, in response to an order placed by the portable table top terminal, inputs a product-ready indication and transmits said product ready indication to the table top terminal, and
   the portable table top terminal inputs an order-received indication and transmits the order-received indication to the kitchen terminal.

21. The service managing system of claim 11, wherein at least one of the portable table top terminal and the counter top terminal indicates material information selected from the group consisting of producing districts, suppliers, products obtained without using pesticides, or products obtained through organic culture.

22. The service managing system of claim 1 further comprising:
an image input unit that creates a menu.

23. The service managing system of claim 7, further comprising:
an analysis unit that collects data concerning a number of people observing a commercial, a time of commercial viewing, and a number of commercials viewed.

24. The service managing system of claim 11, further comprising:
a communications device that verbally repeats contents of orders input via the portable table top terminal or the counter top terminal.

25. The service managing system of claim 11 wherein at least one of the portable table top terminal and the counter top terminal specifies a time for service to prolong a time of service, or terminate an order.

26. The service managing system of claim 1, wherein a plurality of portable table top terminals display a bill common to a group seated at a plurality of tables.

27. The service managing system of claim 1, wherein working statuses of employees are continuously monitored and a work command is preferentially issued to idle employees.

28. The service managing system of claim 11, wherein the portable table top terminal or the counter top terminal displays a sum of ordered items on real time basis.

29. The service managing system of claim 1, wherein the portable table top terminal is put into operation mode for ordering, as soon as the portable table top terminal is received by the terminal receptacle.

30. The service managing system of claim 1, wherein the identification number identifies a table.

* * * * *